United States Patent [19]

Diehr et al.

[11] 3,870,665
[45] Mar. 11, 1975

[54] PROCESS FOR MAKING PRESSURE MOLDED LIGNOCELLULOSE ARTICLES COMPRISING ISOCYANURATE GROUP FORMING MOLD RELEASE AGENT

[75] Inventors: Hans-Joachim Diehr, Wuppertal, Germany; Karl-Josef Kraft, Coraopolis, Pa.; Hanns Immo Sachs, Cologne, Germany

[73] Assignee: Bayer Aktiengesellschaft, Leverkusen, Germany

[22] Filed: May 9, 1974

[21] Appl. No.: 468,788

[30] Foreign Application Priority Data
May 22, 1973 Germany............................ 2325926

[52] U.S. Cl................. 260/17.2, 156/328, 156/331, 161/190, 260/9, 260/17.3
[51] Int. Cl............................................. C08g 51/18
[58] Field of Search...... 260/9, 17.2, 17.3, 77.5 NC, 260/2.5 AW

[56] References Cited
UNITED STATES PATENTS

| | | | |
|---|---|---|---|
| 3,660,354 | 5/1972 | Velzmann | 260/9 |
| 3,666,593 | 5/1972 | Manlee | 156/285 |
| 3,723,363 | 3/1973 | Shaw | 260/2.5 AW |
| 3,725,357 | 4/1973 | Fabris | 260/77.5 NC |
| 3,736,298 | 5/1973 | Schmit et al. | 260/77.5 NC |
| 3,823,119 | 7/1974 | Vestal et al. | 260/77.5 NC |

FOREIGN PATENTS OR APPLICATIONS

| | | | |
|---|---|---|---|
| 966,338 | 8/1964 | Great Britain | 260/77.5 NC |

*Primary Examiner*—Harold D. Anderson
*Assistant Examiner*—Edward Woodberry
*Attorney, Agent, or Firm*—Gene Harsh

[57] ABSTRACT

Plywood, fiberboard and other compression molded articles are prepared by compression molding wood chips or other lignocellulose material with an organic polyisocyanate and a catalyst which promotes reaction of isocyanato groups to form isocyanurates.

16 Claims, No Drawings

PROCESS FOR MAKING PRESSURE MOLDED LIGNOCELLULOSE ARTICLES COMPRISING ISOCYANURATE GROUP FORMING MOLD RELEASE AGENT

This invention relates generally to the compression molding of lignocellulose materials into sheets and the like and more particularly to an improved compression molding process for making plywood, fiberboard and the like.

The manufacture of boards or moldings in molding presses by bending lignocellulose-containing fibers, chips or layers is already known. The binders which have preferably been used for this purposes up to now are condensation products of formaldehyde with urea, melamine or phenol. Materials containing lignocellulose produced in this way are, however, unsatisfactory because of their lack or durability and their susceptibility to moisture under the conditions to which they are frequently subjected when they are used for building purposes.

The use of polyisocyanates as binders and/or impregnating agents for lignocellulose materials have been proposed with a view to increasing the stability of the products and their susceptibility to moisture as well as their mechanical strength. In addition to their quality improving properties, polyisocyanates have far-reaching process technical advantages when used as binders, as have been disclosed in German Offenlegungsschrift No. 2,109,686.

The large scale industrial manufacture of materials which contain lignocellulose such as chipboard, fiberboard or plywood bonded exclusively with polyisocyanates have previously been difficult because of the tendency of the products to adhere firmly to all metal parts after they have been compression molded, expecially to the steel or aluminum sheets or molds of the press.

All the methods previously proposed or carried out to solve this problem of releasing or separating the products from metal after their manufacture have substantial disadvantages. Although mold release agents which have been specifically developed for isocyanates have an efficient separating effect, when used on a large commercial scale they are not sufficiently reliable and are uneconomical and, moreover, faults in glueing or coating processes subsequently carried out on the boards may arise due to residues of mold release agents left on the boards. The use of release papers entails numerous process difficulties, especially in multistage installations (presses in which several boards can be produced in a single press operation). In addition, the cost of the paper makes it questionable whether this process is economical. The combined use of various binders, e.g. in the case of multilayered chipboards the use of conventional binders in the top layers and isocyanate binders in the middle layer, results in only a partial improvement in the end product.

It is therefore an object of this invention to provide a process for compression molding materials which contain lignocellulose and are bonded with an organic polyisocyanate which is devoid of the foregoing disadvantages. Another object of the invention is to provide a novel mold release agent for use in the compression molding of lignocellulose materials with an organic polyisocyanate bonding agent. Still another object of the invention is to provide an improved process for compression molding articles from woodchips or the like with an organic polyisocyanate binder.

The foregoing objects and others are accomplished in accordance with this invention, generally speaking, by providing a process for molding a lignocellulose material such as wood chips, shavings or the like with an organic polyisocyanate binder in a mold coated with a release agent which contains a catalyst for the polymerization of -NCO groups to form isocyanurate rings.

It has now surprisingly been found that, when lignocellulose-containing materials which have been bonded and/or improved with polyisocyanates are molded in molding presses, they can be completely separated from all the metal parts such as the steel or aluminum sheets or molds of the press provided compounds which catalyze the formation of isocyanurates from isocyanates are used as the mold release agents.

This invention therefore provides a process for the production of lignocellulose-containing materials which are bonded and/or improved with polyisocyanates by compression molding at elevated temperature and pressure, characterized in that compounds which catalyze the formation of isocyanurates from isocyanates are used as the mold release agent. The invention also provides products made by the process.

The process according to the invention makes it possible to produce lignocellulose-containing materials which are bonded and/or improved with polyisocyanates throughout their cross-section and which have improved surfaces simply, reliably and economically on a large industrial scale, and moreover these materials can be protected against destruction by fungi, insects or fire by the addition of the usual commercial protective agents.

Any catalytic amount of any catalyst known to promote reaction of -NCO groups to form isocyanurate rings may be used in the mold release agent according to the invention such as, for example, strong bases such as quaternary ammonium hydroxides, e.g. benzyl trimethylammonium hydroxide, alkali metal hydroxides, e.g. potassium hydroxide and alkali metal alcoholates, e.g. sodium methylate and the like. Other suitable catalysts include materials which have a less strongly basic character, for example alkali metal salts of carboxylic acids such as sodium acetate, potassium acetate, potassium-2-ethylhexoate, potassium adipate and sodium benzoate and alkali metal salts of phenols such as sodium phenolate as well as certain tertiary amines such as N-alkylethyleneimines and tris-3-dimethylaminopropylhexahydro-s-triazine, potassium phthalimide and the like. Non-basic metal salts of carboxylic acids which are also known to catalyze the formation of isocyanurate, e.g. lead octoate, may also be used. In many cases, it is advantageous to use the above mentioned catalysts in combination with materials which are not alone capable of polymerizing isocyanates to any significant extent. Materials which correspond to this description include the majority of aliphatic tertiary amines, e.g. 1,4-diazabicyclo-(2,2,2)-octane and N,N-dimethylbenzylamine, certain organic metal compounds, e.g. stannousoctoate and dibutyl tin dilaurate, and epoxides, e.g. propylene oxide, phenylglycidyl ethers and the diglycidyl ethers of the 2,2-bis-4-hydroxyphenylpropane. Some tertiary amines, e.g. 1,4-diazabicyclo-(2,2,2)-octane and N,N-dimethylcyclohexylamine acts as catalysts for the polymerization of isocyanates in the presence of epoxides.

Other catalysts which may be used as the mold release agents according to the invention include guanidines of the general formula

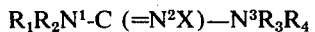

and/or isobiguanidines of the general formula

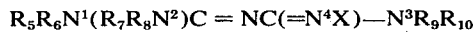

in which the groups $R_1$-$R_{10}$ and X are preferably hydrogen, $C_1$-$C_4$ alkyl groups or $C_6$-$C_{15}$ aryl groups. The following are particularly suitable: 1,1,3,3-tetramethylguanidine; 1,1,2,2,3,3,4-heptamethylisobiguanide; 1,1,2,3,3,-pentamethylguanidine; 1,1,3,3-tetramethyl-2-butylguanidine; 1,1,2,3,3-pentaethylguanidine; 1,1,3,3-tetramethyl-2-phenylguanidine; 1,1,3,3-tetramethyl-2-(4-chlorophenyl)-guanidine; 1,3-dimethyl-1,3-diethylguanidine; 1,1,3,3-tetramethyl-(phenylcarbamoyl)-guanidine; 1,1,2,2,3,3-hexamethylisobiguanide and 1,1,2,2,3,3-hexamethyl-4-(phenylcarbamoyl)-isobiguanide; monovalent or higher valent Mannich bases of condensable phenols which may be substituted with alkyl, aryl or aralkyl groups, oxo compounds and secondary amines and the aryl urethanes of these compounds which can be obtained by reacting the above mentioned Mannich bases with aliphatic or aromatic monoisocyanates or diisocyanates. Ammonium salts of the above mentioned Mannich bases may also be used in the process according to the invention.

It is preferred to use those compounds which are obtained by reacting the monovalent or higher valent Mannich bases of condensable phenols, oxo compounds and secondary amines with known acylating agents such as aliphatic and aromatic mono- or diisocyanates. Acylation may, however, also be carried out by means of monobasic or higher basic carboxylic acid chlorides in the presence of acid binding agents.

Other suitable catalysts for use in the invention which catalyse the reaction of isocyanato groups to form an isocyanurate ring are disclosed by Saunders and Frisch in the book, *Polyurethanes: Chemistry and Technology*, published by Interscience Publishers, copyright 1964, the disclosure of which is incorporated herein by reference.

According to the invention, these compounds may be used in quantities of 0.1 percent to 50 percent by weight, preferably 1 percent to 20% by weight, based on the quantity of polyisocyanate used. They may be used either as mixtures with the polyisocyanate, and may be in the form of microcapsules, or with the addition of organic solvents or separately either alone or in solution. They are applied by spraying, immersion, roller application or brush application. In one embodiment of the process according to the invention, the mold release compounds used according to the invention, either alone or in solution, are sprayed on the surface of the molding which is to be pressed, on the sheets of the press or on the mold of the press.

Any suitable organic polyisocyanate may be used such as, for example, aliphatic, cycloaliphatic or araliphatic, preferably aromatic divalent and higher valent isocyanates, e.g. alkylene diisocyanates such as tetramethylene-1,4-diisocyanate and hexamethylene-1,6-diisocyanate, cyclohexane-1,4-diisocyanate, arylene diisocyanates and their alkylation products such as phenylene-1,3-diisocyanate, phenylene-1,4-diisocyanate, naphthylene diisocyanates, diphenylmethane diisocyanates, tolylene diisocyanates, di- and triisopropylbenzene diisocyanates and triphenylmethane triisocyanates, triesters of p-isocyanatophenylthiophosphoric acid, triesters of p-isocyanatophenylphosphoric acid, aralkyldiisocyanates such as 1-(isocyanatophenyl)-ethylisocyanate or kylylene diisocyanates. Polyisocyanates which are substituted with various substituents such as alkoxy or nitro groups or chlorine or bromine atoms may also be used. Polyisocyanates which have been modified with less than equivalent quantities of polyhydroxyl compounds such as trimethylolpropane, butanediol, glycerol or hexane-1,2,6-triol are also suitable. The polyisocyanates which can be prepared according to Belgian Patent specification No. 714,850 and German Auslegeschrift No. 1,092,007 are also suitable for the purpose of the invention. The polyphenyl-polymethylene polyisocyanate which can be prepared by the phosgenation of formaldehyde-aniline condensates is preferred.

Isocyanates which contain carbodiimide, uretdione, uretone imine and isocyanurate groups may also be used. Mixtures of the various isocyanates may, of course, also be used, and according to German Offenlegungsschrift No. 2,109,686, the residues obtained from the distillation of crude commercial diisocyanatotoluene isomer mixtures as well as monoisocyanates such as phenyl isocyanate or naphthyl isocyanate may be included. Other suitable isocyanates include e.g. polyisocyanates which are masked with phenols, oximes or bisulphite, and the reaction products which contain isocyanate groups obtained by reacting polyisocyanate with less than equivalent quantities of acetals such as methylol, as well as isocyanates with isocyanurate rings.

Other suitable polyisocyanates are disclosed in the book by Saunders and Frisch identified above. In the process according to the invention, conventional binders based on ureaformaldehyde, melamine formaldehyde and phenolformaldehyde condensates may be used as mixtures or separately in addition to the binders and/or impregnating agents which are based on isocyanates.

The following lignocellulose-containing materials may be produced by the process according to the invention without the mold release agents or separating processes normally required when isocyanate binders are used: 1. Boards or moldings made of lignocellulose-containing material in the form of powders, fibers, chips or granules such as size reduced wood or straw, flax, sisal, hemp, sugarcane bagasse, savana grass, bamboo, peanut shells, rice husks and cork scrap. The lignocellulose material is first mixed in the usual manner with about 1 percent to 100 percent by weight (based on dry substance) of the isocyanate based binder or impregnating agent. As already mentioned above, the mold release agent may be added either at the same time as the binder or separately, optionally with the addition of solvents. It is preferred to use mixtures of polyisocyanates and mold release agents according to the invention which can be stored at room temperature. In a similar manner, the material may also be mixed with conventional binders as well as with protective agents against destruction by insects, molds or fire. The material is then compression molded, generally at elevated temperature and pressure. 2. Boards or moldings of veneers, paper or fabrics which are treated as described under 1 and then generally pressed at elevated temperature and pressure. 3. Multilayered boards or moldings of veneers and middle layers in the form of strips or rods, so-called joiner plates, in which the veneers are treated as described under 1, and then pressed with the middle layers, generally at elevated temperature and pressure.

EXAMPLES

The following isocyanurate catalysts are used as mold release agents in the examples:

A: Mixture of N-phenylcarbamic acid-(2-dimethylaminomethyl-4-isononyl)-phenyl ester and N-phenylcarbamic acid (2-isononyl-4-dimethylaminomethyl)-phenyl ester B: Mixture of N-cyclohexylcarbamic acid (2-dimethylaminomethyl-4-isononyl)-phenylester and N-cyclohexylcarbamic acid (2-isononyl-4-dimethylaminomethyl)-phenyl ester C: Mixture of N-cyclohexylcarbamic acid (2-di-n-butylaminomethyl-4-isononyl)-phenylester and N-cyclohexylcarbamic acid (2-isononyl-4-di-n-butylaminomethyl)-phenylester D: N-n-propylcarbamic acid (2-dimethylaminomethyl-4,6-dimethyl)-phenylester E: Benzoic acid (2-dimethylaminomethyl-4,6-dimethyl)-phenyl ester F: Hexahydrotriazine G: Potassium salt of coconut fatty acid (mixture of several fatty acids) dissolved in methanol.

EXAMPLE 1

A mixture of 65 g of diphenylmethane diisocyanate, 16 g of dimethylformamide and 12 g of catalyst A is added to 930 g of top layer chips of 75 percent soft wood and 25 percent hard wood with a moisture content of 15 % in a conventional glueing apparatus. In addition, 2,120 g of chips of 50 percent soft wood and 50 percent heavy hard wood with a moisture content of 10 percent are mixed with 116 g of diphenylmethane diisocyanate for a middle layer. These two materials are used to form a three-layered molding on a steel sheet. After compression molding for 3 minutes at a specific pressure of 25 5 kp/cm$^2$ and temperature of 150°C, a very strong and moisture-resistant board 16 mm in thickness is obtained which detaches itself spontaneously from the steel sheets of the press.

EXAMPLE 2

A mixture of 105 g of diphenylmethane diisocyanate and 4 g of catalyst D is added to 1,900 g of soft wood chips with a moisture content of 10 percent in a conventional glueing apparatus. This material is used to form a single layered molding by placing it on an aluminum sheet and covering it with another aluminum sheet. After pressure molding for one minute at a temperature of 170°C and a specific pressure of 25 to 5 kp/cm$^2$, a very strong chipboard 10 mm in thickness is obtained which is released spontaneously from the aluminum sheets.

EXAMPLE 3

A mixture of 70 g of diphenylmethane diisocyanate and 4 g of catalyst B is added to 600 g of top layer soft wood chips with a moisture content of 25 percent in a conventional glueing apparatus, and a second batch is prepared by adding 48 g of diphenymethane diisocyanate to 530 g of top layer chips of 50 percent soft wood and 50 percent hard wood with a moisture content of 10 percent and 190 g of 4,4'-diphenylmethane diisocyanate to 2,500 g of middle layer chips composed of 25 percent soft wood, 25 percent hard wood and 50 percent straw. These materials are used to form a 5-layered molding on a steel sheet, the soft wood top layer chips forming the outermost layer. After pressure molding for 2 minutes at 180°C and a specific pressure of 35 to 5 kp/cm$^2$ gauge, a chipboard 20 mm in thickness is obtained which is released spontaneously from the steel sheet or plates of the press and which is characterized by high bending strengths and moisture resistance as well as by having an extremely hard wearing surface which will absorb moisture only with difficulty.

EXAMPLE 4

3,400 g of straw chips are sprayed with a 10 percent aqueous solution of a CKF salt (inorganic fungicide based on Cu-Cr-fluoride). A mixture of 130 g of diphenylmethane diisocyanate and 13 g of catalyst B is then added to the chips in a conventional glueing apparatus. The molding obtained after 45 seconds pressure molding at a temperature of 190°C and pressure of 50 kp/cm$^2$ can be immediately released from the steel mold and is very strong and resistant to moisture and to attack by molds and can be used e.g. for the manufacture of prefabricated ceilings.

EXAMPLE 5

A mixture of 2,500 g of wood chips and 500 g of rice husks is immersed in a 10 percent aqueous monoammonium phosphate solution and then dried to a residual moisture content of 12 percent and sprayed with a mixture of 200 g of diphenylmethane diisocyanate and 20g of catalyst C. After pressure molding between steel sheets at 160°C and a pressure of 25 to 5 kp/cm$^2$, the chipboard obtained can immediately be released from the sheets of the press and in addition to having good finishing properties it can be classified as "flame resistant" (according to DIN 4102).

EXAMPLE 6

3,000 g of wood chips in a conventional glueing apparatus are simultaneously sprayed with 320 g of a phenolformaldehyde resin which can be set with alkalies and a mixture of 140 g of diphenylmethane diisocyanate and 14 g of catalyst C. The chipboard obtained after 2 minutes' pressure molding at a pressure of 20 to 5 kp/cm$^2$ and a temperature of 180°C has unexpectedly good properties and can immediately be detached from the sheets of the press.

EXAMPLE 7

A mixture of 70 g of diphenylmethane diisocyanate, 5 g of catalyst C, 46 g of paraffin emulsion and 270 g of urea formaldehyde resin is added to 2,400 g of size reduced sugarcane bagasse in a conventional glueing apparatus and the mixture is then pressure molded for 90 seconds at a pressure of 20 to 5 kp/cm$^2$ and a temperature of 190°C. A very strong chipboard which can easily be detached from the sheets of the press is obtained.

EXAMPLE 8

1,000 g of defibrator material with a moisture content of 10 percent is vigorously mixed with 37 g of diphenylmethane diisocyanate in a glueing apparatus conventionally used for fibrous materials. This material is used to produce a molding on a steel sheet which has previously been covered by rolling with a methylol solution of catalyst F, and an aqueous solution of catalyst F is then sprayed on the surface of the material. After pressure molding for 30 seconds at a specific pressure of 30 to 10 kp/cm$^2$ and a temperature of 200°C, a very strong fiber board 5 mm in thickness which is smooth on both sides and can be spontaneously detached from the steel sheets is obtained.

EXAMPLE 9

Two birch veneers with a moisture content of 7 percent and 1.5 mm in thickness are steeped for 10 seconds in a mixture of 80 percent diphenylmethane diisocyanate, 8 percent of catalyst D and 12 percent of dimethylformamide, and after 30 minutes they are pressure molded together with an 18 mm thick middle layer of rods of Cabun wood with the fibers staggered in arrangement (randomly arranged) without the addition of binder, these layers being pressed between two steel sheets for 2 minutes at a specific pressure of 15 kp/cm$^2$ and a temperature of 140°C. A hard wearing joiner plate 20 mm in thickness with a high quality surface is obtained which can easily be detached from the steel sheets after compression molding.

EXAMPLE 10

5 Beech veneers 1.0 mm in thickness and with a moisture content of 7 percent are steeped for 10 seconds in a mixture of 95 percent of diphenylmethane diisocyanate and 5 percent of dimethylformamide. After 30 minutes, the veneers are superimposed on each other with the fibers in alternate directions and then pressure molded for 4 minutes at a specific pressure of 20 kp/cm$^2$ and a temperature of 130° C between two aluminum sheets which had previously been treated with 50g/m$^2$ of catalyst G. A very hard wearing and weather resistant veneer panel about 5 mm in thickness is obtained which can easily be detached from the aluminum sheets after pressing.

Any of the other catalysts disclosed herein may be used to facilitate release of the molding from the mold instead of those used in the foregoing examples. Also, any of the other lignocellulose containing materials disclosed herein and other suitable polyisocyanates can be substituted for those in the foregoing examples.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims. The polyisocyanate employed in all of the working examples is the commercially available crude diphenylmethane diisocyanate obtained by phosgenation of crude formaldehydeaniline condensates with an NCO-content of 30–32 percent by weight. All percentages are by weight unless otherwise indicated.

What is claimed is:

1. In a process for compression molding of lignocellulose-containing materials wherein an organic polyisocyanate is mixed with the materials during molding, the improvement which comprises including a catalyst which promotes isocyanurate formation from isocynates in the mixture as a mold release agent.

2. The process of claim 1, wherein the mold release agent is a phenol-Mannich base.

3. The process of claim 1, wherein the mold release agent is tris-(dimethylaminopropyl)-S-hexahydrotriazine.

4. The process of claim 1, wherein the mold release agent is an alkali metal salt of a carboxylic acid.

5. The process of claim 1, wherein the lignocellulose-containing material is a powder or chips and the binder is a mixture of polyisocyanates and 0.1 to 50 parts by weight based on the weight of polyisocyanate of the mold release agent.

6. The process of claim 5, wherein mixtures which are stable at room temperature composed of polyisocyanates and polyisocyanurate catalysts are used.

7. The process of claim 1, wherein the surfaces of the material to be molded are sprayed with a polyisocyanurate catalyst prior to molding.

8. The process of claim 1, wherein the surfaces of the sheets, plates or molds of the press which come into contact with the molding are coated with polyisocyanurate catalysts.

9. The process according to claim 1, wherein the polyisocyanate is crude diphenylmethane diisocyanate.

10. The process of claim 1, wherein a urea formaldehyde, melamine formaldehyde or phenol formaldehyde resin is included as a binder together with the polyisocyanate.

11. The process of claim 1, wherein the materials which contain lignocellulose are treated with protective agents against insects and/or molds.

12. The process of claim 1, wherein the materials which contain lignocellulose are treated with fireproofing protective agents.

13. The molded product of the process of claim 1.

14. In the preparation of molded sheet material by a process wherein particles of a lignocellulose material are wet with an organic polyisocyanate and compression molded, the improvement which comprises including as a mold release agent in the mixture to be molded a catalyst which promotes reaction of isocyanato groups to form isocyanurates.

15. The process of claim 14, wherein the mold release agent is mixed with the polyisocyanate.

16. The process of claim 14, wherein the mold release agent is applied to the mold surfaces.

* * * * *